United States Patent [19]

Chambers Arthur E.

[11] Patent Number: 5,101,693
[45] Date of Patent: Apr. 7, 1992

[54] INSULATION CUTTING AND STRIPPING TOOL

[75] Inventor: Chambers Arthur E., Wyandotte, Mich.

[73] Assignee: Alco Industries, Inc., Valley Forge, Pa.

[21] Appl. No.: 740,224

[22] Filed: Aug. 5, 1991

[51] Int. Cl.⁵ .............................................. H02G 1/12
[52] U.S. Cl. ...................................... 81/9.430; 81/9.41
[58] Field of Search ...................... 81/9.4, 9.41, 9.42, 81/9.43; 30/90.4, 91.1

[56] References Cited

U.S. PATENT DOCUMENTS

| | | | |
|---|---|---|---|
| 2,601,797 | 7/1952 | Holt | 81/9.43 |
| 3,336,666 | 8/1967 | Calkin | 30/90.1 |
| 4,395,928 | 8/1983 | Umdin et al. | 81/9.43 |
| 4,627,314 | 12/1986 | Wiebe et al. | 81/9.43 |
| 4,768,404 | 9/1988 | Biegasnki | 81/9.43 |

*Primary Examiner*—Douglas D. Watts
*Attorney, Agent, or Firm*—Dykema Gossett

[57] ABSTRACT

A tool for stripping tubular insulation off of a wire without contacting the wire comprises a hollow body in the shape of a pistol having a nose at one end with an aperture upon a longitudinal axis, adapted to axially receive an insulated wire to be stripped, a pistol grip and a trigger pivotally mounted within the body, which includes a fixed jaw. An upper jaw overlies the fixed jaw, extends into and is pivotally mounted upon the body and terminates in a jaw arm. A resilient wire stripper is operably nested and retained between the jaws and includes a pair of opposed outwardly biased support arms terminating in a pair of opposed spaced transversely slotted blade mounting heads with co-planar blades secured within the heads having opposed semi-circular openings at their meeting edges of a radius slightly greater than the radius of the wire. A cam upon the trigger is arranged adjacent to the jaw arm so that initial manual retraction of the trigger moves the cam to operatively engage the jaw arm for pivotally closing the movable jaw relative to the fixed jaw with the blades cutting through the insulation.

22 Claims, 4 Drawing Sheets

INSULATION CUTTING AND STRIPPING TOOL

FIELD OF THE INVENTION

The present invention relates to a tool for cutting the insulation of wires, and more particularly to cutting of such insulation and stripping thereof from a central wire strand.

BACKGROUND OF THE INVENTION

Previously there have been efforts to provide tools capable of cutting insulation from wires as required particularly for electrical connections. One of the difficulties in previous efforts has been the lack of means for protecting the central wire core from damage or from contact by the cutting blades for the insulation. Another problem has been the lack of an assurance that the insulation stripped from the wire and the correspondingly exposed portion of the wire will be same each time because of the absence of any means for predetermining the length of the portion to the stripped from the wire. Previously stripping blades wear out the entire tool is normally required to be replaced. Previously in most prior art efforts, the stripping tool was limited to a particular diameter of wire from which the insulation was to be removed thereby requiring a separate stripper for wires of different diameters and corresponding insulation. Previously and particularly in the automotive and airplane industry there has been difficulty in the use of conventional strippers in removing insulation from hard to get at or located wires for stripping them in place because of the need to extend the stripper blades in a direction at right angles to the length of the wire. From time to time there may be wear upon the moving parts of the cutting tool and/or stripper such that its jaws and adjacent blades are ineffective for the purpose of cutting the insulation for its removal and wherein the tool must be replaced.

THE PRIOR ART

To Applicant's knowledge the closest prior art is U.S. Pat. No. 3,336,666 which issued Aug. 22. 1967, in favor of the present Applicant's Assignee. The number of the problems heretofore mentioned were characteristic of the above patent over which the present invention is an improvement.

SUMMARY OF THE INVENTION

An important feature of the present invention is to provide insulation cutting and stripping tool which allows the user to strip wire in locations previously inaccessible to an insulation cutting tool such as disclosed in the above U.S. Pat. No. 3,336,666. The above patented tool could not function in close quarters. This necessitated expensive and time consuming measures in order to use the cutting tool such as in the internal wiring of aircraft where it is desirable to strip the wire after it is in place, frequently in very small areas difficult to get at.

An important feature is to provide a built in adjustable stop which permits easy duplication of stripping lengths and wherein the stop is adjustable where it is desired to modify the length of insulation to be removed.

Another feature is to provide a resilient wire stripper removably positioned within the insulation cutting and stripping tool which is easily removable for various other strippers accommodating different wire sizes and diameter of insulation and wherein the stripper may be replaced once there is considerable wear of the blades used in the present tool.

An important feature is to provide an improved wire stripper of a resilient material which includes a pair of outwardly biased support arms terminating in a pair of opposed spaced transversely slotted blade mounting heads with co-planer blades with suitable backup plates mounting the blades. The blades include opposed semi-circular cutting openings at their meeting edges, of a radius slightly greater than the radius of the wire, so that there is no scratching or other damage to the central wire core either during cutting or during stripping of the insulation therefrom.

As another feature, the present wire stripping tool includes a hollow body in the shape of a pistol having a nose at one end with an aperture arranged upon a longitudinal axis adapted to axially receive an insulated wire to be stripped. The body includes a pistol grip and a trigger pivotally mounted within the body.

An important feature resides in the assembly of the respective blades upon corresponding mount plates and the accurate location of the mount plates and the centering thereof with respect to the longitudinal axis of the body. The blades and backing plates are removably supported and mounted within opposed transverse slots within the heads of the stripper and are adapted for cooperating registry for severing the tubular insulation.

As a further feature there is provided a control for the stripper wherein subsequent to the severing of the insulation the stripper may be retracted on continued retraction of the trigger such as to axially separate the severed insulation from the wire without contact therewith.

An important feature includes the provision of a removable upper jaw which is pivotally mounted upon the tool body and wherein the stripper is interposed between the fixed and movable jaws of the tool. The moveable jaw includes a jaw arm engagable by a cam upon the trigger for rotating the jaw arm and pivotally closing the movable jaw relative to the fixed jaw, with the blades cutting through the insulation at the openings therein.

These and other features and objects will be seen in the following specification and claims in conjunction with the appended drawings:

The above drawings illustrate a preferred embodiment of the invention. Other embodiments are contemplated within the scope of the claims hereafter set forth.

DETAILED DESCRIPTION OF AN EMBODIMENT OF THE INVENTION

Figures 1, 2, 3, 4:
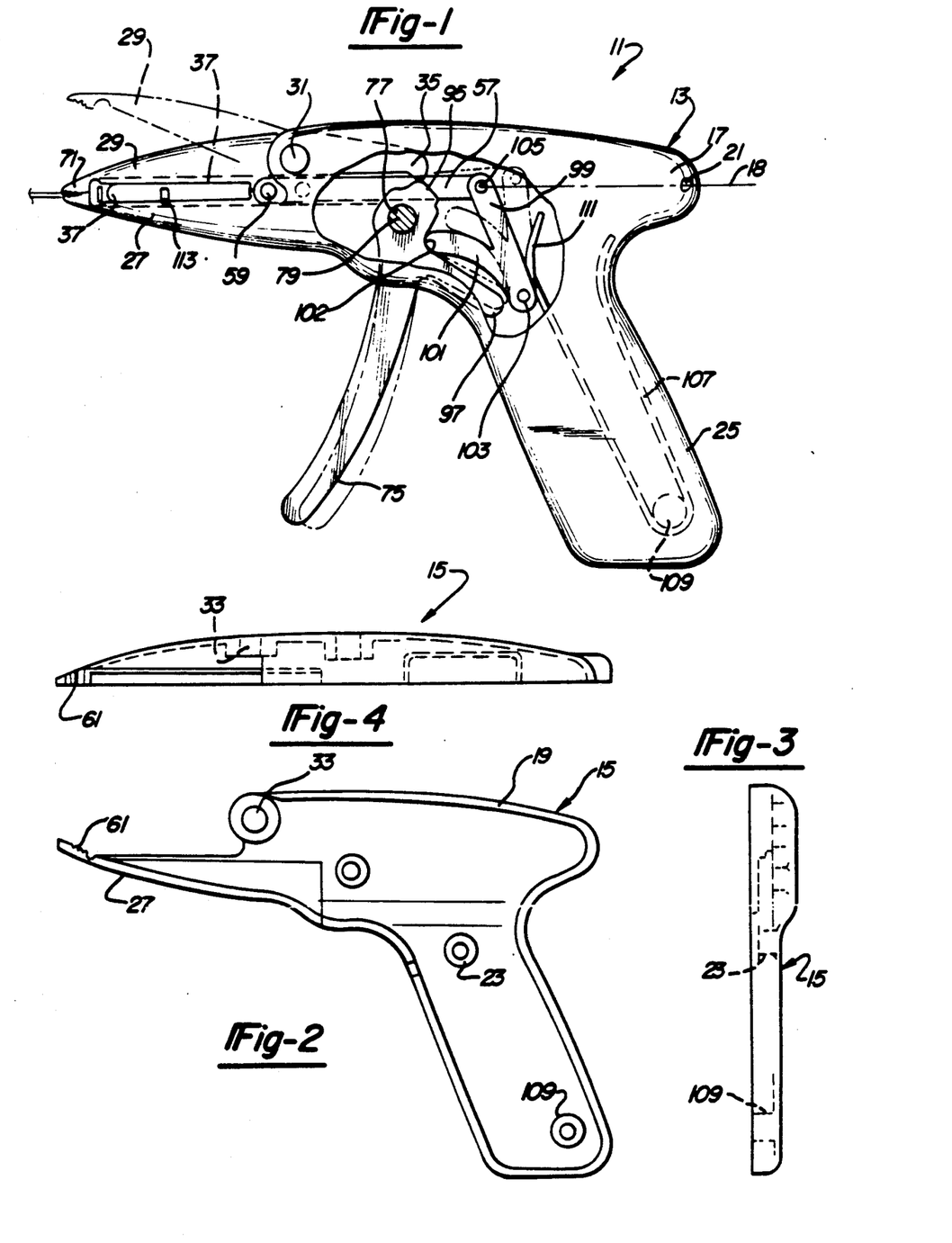
FIG. 1 is a side elevational view of the present tool for cutting and stripping tubular insulation from a wire.
FIG. 2 is a side elevational view of one of the symmetrical body halves of the tool body shown in FIG. 1.
FIG. 3 is an end elevational view thereof.
FIG. 4 is a plan view thereof.

Referring to the drawings, FIGS. 1-19 the present stripping tool, sometimes referred to as a wire stripping gun, is generally indicated at 11, FIG. 1, and includes a body 13 of a molded plastic material, such as ABS or the like. The body includes right-hand body part 15, FIG. 4, and left-hand body part 17. These are molded as symmetrical elements consisting of a pair of molded body halves arranged upon opposite sides of a plane passing through the longitudinal axis 18. Each of the respective body parts 15 and 17 include a symmetrical peripheral flange 19, FIG. 4, in opposing cooperative registry. The respective body parts 15 and 17 are held together by plurality of self-threading screws 21.

Each of the body parts 15 and 17 include a plurality of apertured bosses 23 with the bosses upon one body part loosely receiving the screws 21 and with the screws self-threading into the corresponding apertured bosses of the other body part. The present assembled body 11 is in the shape of a pistol, FIG. 1, having an elongated nose 71 at one end, a pistol handle 25 and with the fixed lower jaw 27 defined by the side by side body parts 15 and 17.

Figure 10:
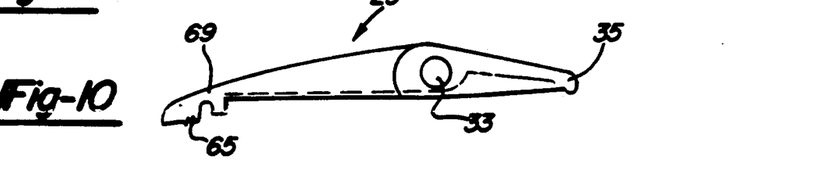
FIG. 10 is a side elevational view of the top jaw shown in FIG. 1.
Figure 11:
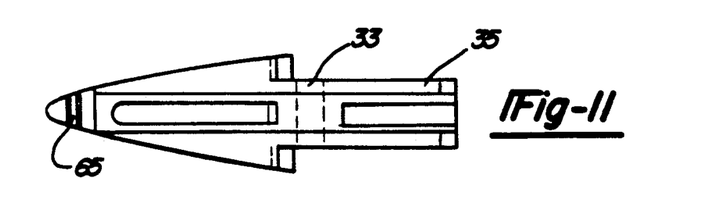
FIG. 11 is a bottom plan view thereof.

Overlying the fixed jaw 27, FIG. 1, there is provided a removable pivotal upper jaw 29 which extends into the body 11 longitudinally thereof and is pivotally connected thereto by the removable hinge pin 31. Said pin extends through aperture 33, FIG. 10, in said upper jaw. Said jaw terminates in the rearwardly extending jaw arm 35 within said body.

Figure 14:
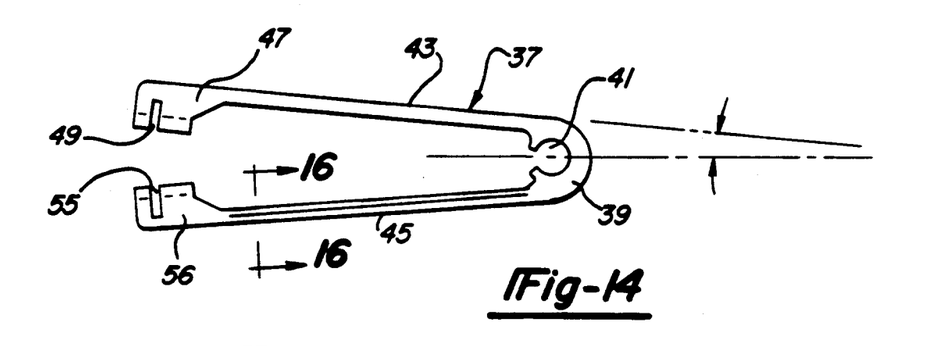
FIG. 14 is a side elevational view of the stripper shown in FIG. 1, on an increased scale, with the jaws in a normally open position.
Figure 15:
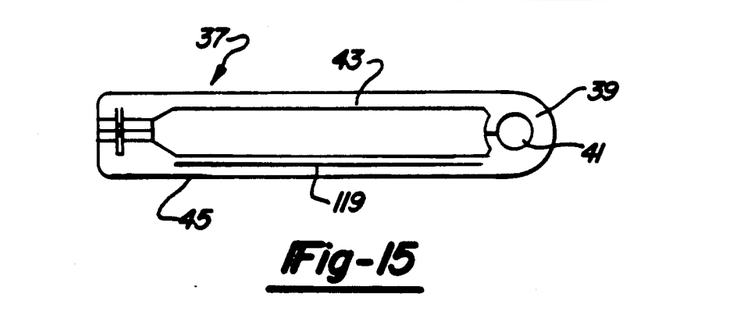
FIG. 15 is a similar view with the jaws shown closed.
Figure 16:
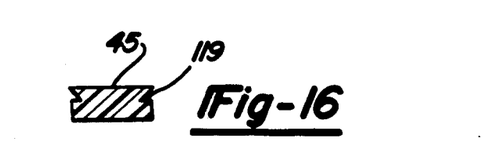
FIG. 16 is a fragmentary section taken in the direction of arrows 16—16 of FIG. 14, on an increased scale.

The wire stripper 37, FIGS. 14 and 15, is constructed of a resilient plastic material and includes a yoke 39 at one end transversely apertured at 41. A pair of opposed outwardly biased support arms 43 and 45, sometimes referred to as blade support upper and lower arms, terminate in the transverse opposed top and bottom heads 47 and 56. Said heads have therein transversely extending opposed blade assembly receiving slots 49 and 55 respectively. One end of the elongated pull rod 57, FIG. 1, extends into yoke 39 and is pivotally connected thereto by the transverse pivot pin 59.

Figure 17:
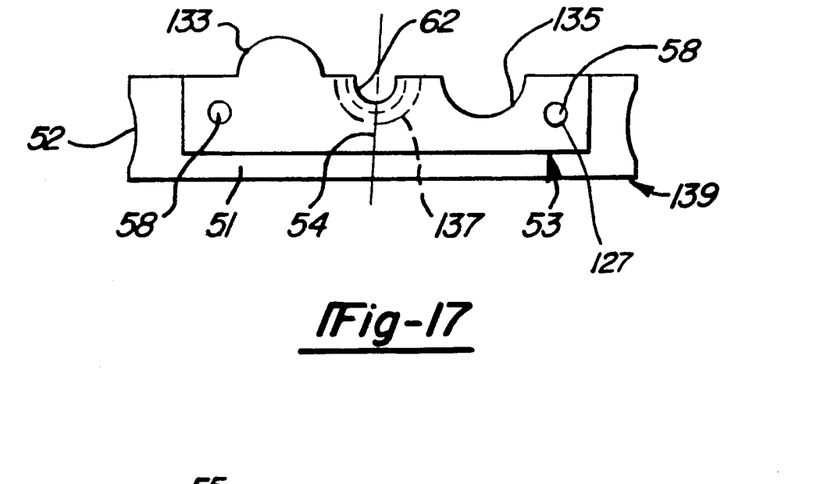
FIG. 17 is a side elevational view of a backup plate with a cutting blade mounted thereon.
Figure 18:
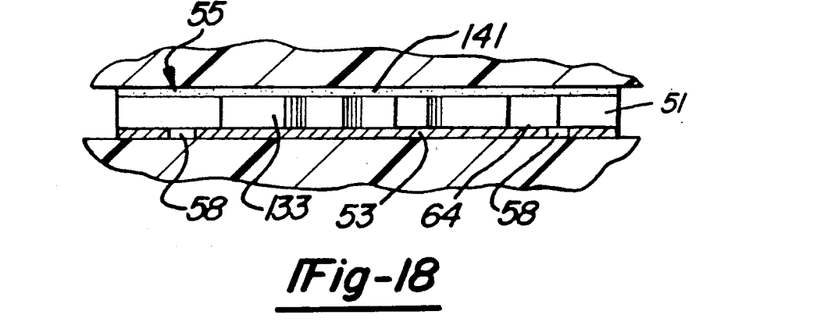
FIG. 18 is a fragmentary plan view of one slotted head of the stripper of FIG. 14, with the backup plate and blade assembly secured therein.
Figure 19:
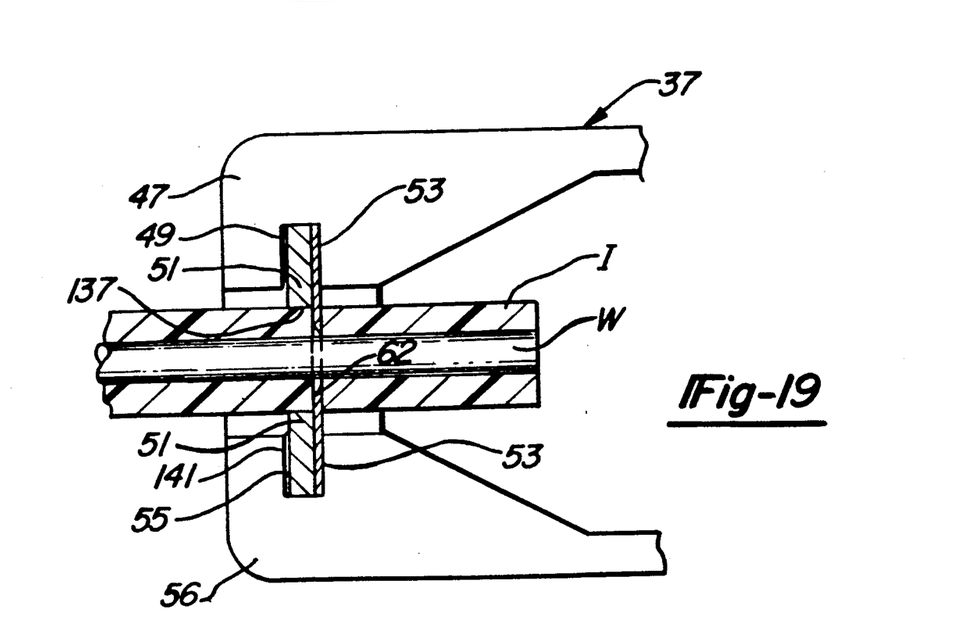
FIG. 19 is a fragmentary side elevational view of the stripper shown in FIG. 15, on an increased scale, with the corresponding backup plates and cutting blades assembled thereon.

Positioned removably within each of the opposed transverse slots 49 and 55 of the top and bottom heads 47 and 56 are opposed aligned backup plates 51, FIGS. 18 and 19. Each plate includes a formed stop 52, FIG. 17, at their ends. On each of the opposed backup plates there is mounted an elongated sharpened stripper blade 53 centered with respect to the backup plate centerline 54. A pair of pins 58 on the respective backup plates 51 extend into corresponding spaced apertures 127, FIG. 17, in the stripper blades 53. The sharpened blades 53 are secured to the backup plates by welding at 64, FIG. 18. The respective backup plate 51 and corresponding stripper blade 53 secured thereto are referred to as a blade assembly 139, FIG. 17. These are assembled into the opposed slots 49 and 55 of the respective ABS stripper heads 47 and 56 and are bonded thereto in opposed relation as by cementing as at 141, FIG. 18.

The corresponding upright centerline 54 of the respective backup plates 51, FIG. 17, and corresponding cutting blades 53 are in registry with the transverse longitudinal axis 18 of body 11. This is to assure that the respective opposed semi-circular cutting apertures 62 of the respective blades will be in proper registry with the insulation I to be severed. The corresponding radii of the cutting blade opposed apertures 62, FIG. 17, is slightly greater than the radii of the wire W to be stripped so as to assure that upon complete closing registry of the opposed blades 53 with respect to the insulation, that only the insulation will be cut through. The respective blades have no contact with the central wire core W. This prevents any contact or damage to the wire filament either during cutting or subsequent stripping of the insulation. During cutting, the opposed edges of the backup plates 51 compressively engage insulation I, FIG. 19.

Figure 7:
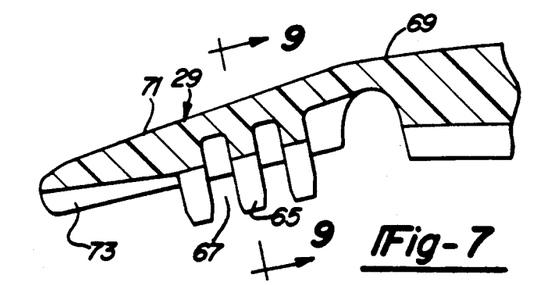
FIG. 7 is a fragmentary view of the pivotal top jaw of FIG. 1, on an increased scale.
Figure 8:
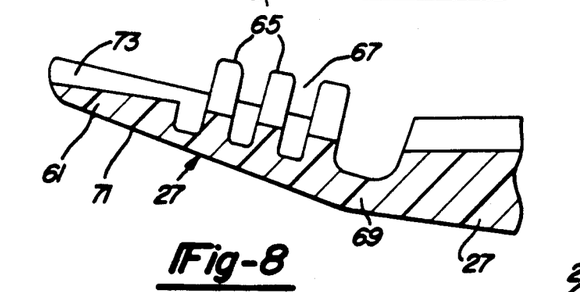
FIG. 8 is a similar view of the bottom jaw.

As shown in the drawing, FIGS. 7 and 8, the fixed jaw 27 and the opposed pivotal upper jaw 29 each have longitudinally spaced tangs 65 with alternating slots 67. The tangs 65 of one jaw are longitudinally displaced with respect to the tangs of the other jaw in order to cooperatively nest within the corresponding slots of the adjacent jaw for a proper interlock therewith when the respective jaws are closed during the severing operation.

Longitudinally inward of the respective tangs 65 there is provided within the adjacent jaws 27 and 29 a cut away or slotted portion to define the flex points 69 in each of the jaws, FIGS. 7 and 8. Thus, when the jaws are closed they are adapted to resiliently engage the insulated wire as initially received within the wire channel 73 of the nose 71 between the respective jaws 27 and 29.

Figure 9:
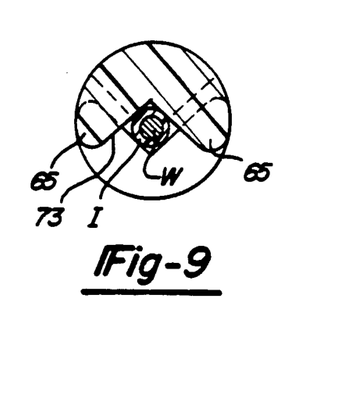
FIG. 9 is a section taken in the direction of arrows 9—9 of FIG. 7.

Each of the respective tangs 65 of said jaws have formed therein opposing slots to thereby define between the respective jaws the longitudinally extending channel 73. Said channel generally extends along the longitudinal axis 18 of the tool body. This provides a means for guidably receiving the wire W with insulation I as it is threaded into nose 71 of tool 11 and its initial registry with adjustable stop 113, FIG. 12. The wire is schematically indicated at W and the insulation at I. The corresponding slotted portions within the interior surfaces of the jaws 27 and 29 are right angular in shape to thereby define a wire channel 73 essentially square in cross section, FIG. 9, to cooperatively and supportably receiving the wire as it is projected axially into the nose 71 of the tool body.

Figure 5:
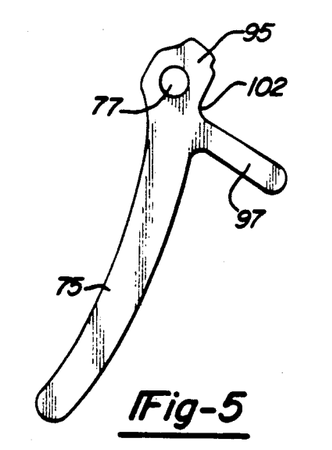
FIG. 5 is a side elevational view of the trigger shown in FIG. 1, on a reduced scale.

The present tool for stripping tubular insulation I includes the formed trigger 75, FIGS. 1 and 5, of general channel shape in cross section, having a transverse aperture 77 intermediate its ends and more closely adjacent one end, FIG. 1. Said aperture is adapted to receive the pivot bolt 79, FIGS. 1 and 13, which is arranged upon a transverse axis 81 displaced from and at right angles to longitudinal axis 18. The trigger pivot 79 includes a hub 83 of cylindrical form nested within one of the body apertures and terminates in a bolt head. A portion of hub 83 is knurled at 85. Intermediate the ends of pivot bolt 79 there is provided a cam cylinder 87 arranged upon a longitudinal axis 89 laterally offset and eccentric to bolt axis 81. Cylinder 87 provides the mounting for trigger 75 extending through its opening 77.

The opposite end of the trigger pivot bolt includes the cylindrical hub 91 which nests within a corresponding aperture in the other body half and is retained thereon by nut 93.

Figure 6:
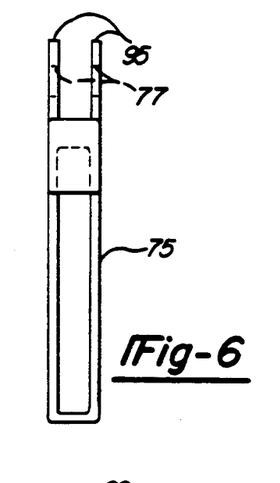
FIG. 6 is an end view thereof.

Trigger 75 at one end terminates in the cam 95 or a pair of laterally spaced cams 95, FIG. 6. The trigger intermediate its ends and more closely adjacent its pivot mounting 79 includes a rearwardly extending trigger arm 97, curved at its end.

Cam lever 99, FIG. 1, including a forwardly extending arcuate cam arm 101 is pivotally mounted at one end at 103 upon body 11, FIG. 1, and is connected at its other end by pivot pin 105 to the rearward end of pull rod 57, on axis 18.

The formed elongated generally U-shaped leaf spring 107 is centrally mounted around the boss 109 within trigger handle 25 of said body and includes bias arm 111 which bears against cam lever 99 normally urging it to the position shown in FIG. 1 and with the stripper 37 forwardly positioned within jaws 27 and 29.

Figure 12:
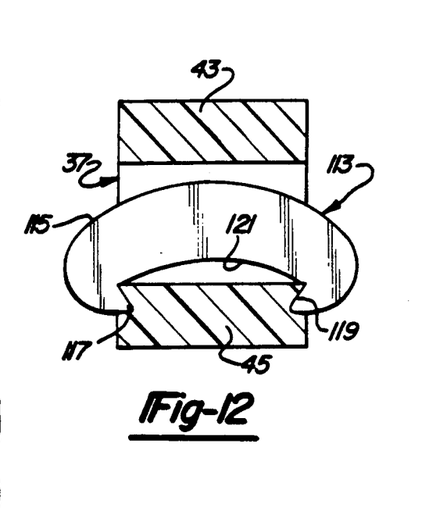
FIG. 12 is a cross sectional view of the adjustable wire stop upon a stripper arm, shown in an increased scale with respect to FIG. 1.

Wire stop 113 is constructed of a resilient plastic material and is adjustably mounted upon stripper arm 45, FIG. 12. Said stop is slidably positioned within opposed grooves 119 upon opposite sides of stripper arm 45.

The undersurface of stop 113 is concave at 121. Stop 113 is longitudinally adjustable upon arm 45 of stripper 37, FIG. 14, for predetermining the length of the insulation I to be severed from insulated wire W. Pressing downwardly upon the convex top portion 115 of stop 113, effects such expansion with respect to the mount bosses 117 as to permit longitudinal sliding adjustment of the stop along the length of the stripper arm 45 for regulating the length of the tubular insulation I to be stripped from wire W.

For repetitive stripping operations the nose 71 is axially assembled over the end of wire W to be stripped. It is advanced longitudinally until the end of the wire and its insulation engages stop 113. The stop is set at a predetermined distance along the length of arm 45. This will assure that each time the length of insulation removed from a particular wire will be the same. All that is required for changing the length of the insulation to be severed and removed is to longitudinally adjust the stop 113 along the length of arm 45.

The insulation cutting method and the cutting blades employed and the functioning of the backup blades is similar to that disclosed in our U.S. Pat. No. 3,336,666, except that the present cutting blades 53 extend transversely of the length of longitudinal axis 18. This is primarily because the nose 71 of the insulation cutting tool is axially positioned over and along the length of the wire and insulation to be severed. The structure, function and operation of the present tool stripper is different from that disclosed in the foregoing patent and allows the user to strip wire in locations previously inaccessible to the cutting tool disclosed in said patent. The present tool can function in close quarters and in areas previously inaccessible to the tool shown in said patent, such as the internal wiring for aircraft where it is desirable to strip the wire after it is in place, frequently in small hard to get at areas.

The built in adjustable stop 113, FIG. 12, permits easy duplication of stripping lengths. All that is necessary to change the stripper for various wire sizes is to remove the upper jaw 29 and pin 31, and replace the stripper 37 with one of the desired size. When the present stripper blades wear out after a period of time, the entire stripper 37 is interchangeable with other strippers. The worn blades 53 may be easily replaced by changing the stripper, and the sizes can be changed to strip all sizes, available in a large selection of wire and insulation diameters. This permits the use of a single tool for a multiplicity of precise wire sizes and types.

The present stripper 37 may be color coded for size designation corresponding to wires to be stripped. It may be inserted into the stripper body 11 by removing the upper jaw 29 and its corresponding pivot pin 31 and pin 59. A stripper 37 with blades of proper size is then inserted. The hinge pin 59 between pull rod 57 and stripper 37 is reconnected. The upper jaw pin 31 is reinserted into the body 11 and through the upper jaw. The stripper is enclosed between jaws 27 and 29 and the unit is ready for use with the replacement stripper in place.

OPERATION

The wire stop 113, FIG. 12, may be moved to the correct location to establish the desired strip length and the wire to be stripped is inserted into the funnel or nose 71 of the stripper body until it reaches the stop 113.

The trigger 75 is then pulled and the cam 95 at the top of the trigger contacts the jaw arm 35 which pivots the upper jaw 29 and drives it into contact with the stripper 37 shearing the wire insulation I.

Another squeeze on the trigger 75 in the same direction actuates the mechanism to pull the stripper 37 rearwardly and with the remaining insulated wire clamped by the jaws, removes the insulation. The insulation is then free to fall from the stripper. The cutting of the wire insulation I is accomplished by the very precise cutting blades 53 supported and guided by the backup plates 51, FIG. 19. Once the insulation is sheared the cam action opens the blades in the stripper several thousandths of an inch so that the blades do not contact the wire and create scratches or gouges as the insulation is stripped from the wire.

In the further retraction of trigger 75 after severing of the insulation, the trigger arm 97 operatively engages cam arm 101, FIG. 1, rotating it and cam lever 99 a limited distance in a clockwise direction. This causes a retraction of pull rod 57 and yoke 39 of the stripper connected to the pull rod. It is this subsequent retraction of the trigger 75 and corresponding retraction of pull rod 57 and stripper 37 which axially removes the severed insulation from the wire without contact to the wire or damage thereto. This further retracting action of the cam lever 99 is against the opposing action of leaf spring arm 111 which normally biases the pull rod 57 and stripper 37 to the position shown in FIG. 1.

With pressure relieved from a trigger 75 one end of the cam arm 101 operatively engages the lever 75 at 102, FIG. 1, to bias the trigger to its initial position shown in FIG. 1, under the action of the leaf spring arm 111.

Figure 13:
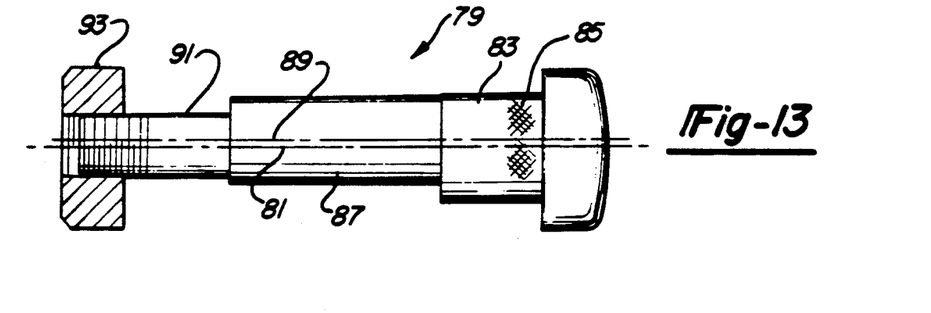
FIG. 13 is a side view of the pivot bolt for the trigger, on an increased scale with respect to FIG. 1.

The trigger 75 is pivoted upon the shoulder hinge bolt 79, FIG. 13, which may be rotatively adjusted to provide for more or less jaw pressure or to compensate for any wear that may occur. Adjustment is made by removing the nut 93 partially from the bolt and axially sliding the bolt partially out of the body until the serrations 85 show. The bolt is then rotated to increase or decrease the cam pressure of cam cylinder 87. The bolt is replaced to its initial position and the nut 93 is tightened until the serrations 85 are back in the body.

The pistol grip 25 is provided with an engraved portion to prevent slippage. The entire unit is designed to be easily operated on a continuous basis. It is manufactured from anti-static plastics that are intended for use in almost any environment and will resist hard usage and prevents static electrical discharges, particularly when the tool is in use on electronic circuitry.

BLADE ASSEMBLY

The present opposed cutting blades 53 are initially constructed from a razor blade steel stock SAE 1090, .004 inches thick, for illustration. For a particular diameter of wire core from which insulation is to be removed, the radius of the corresponding opposed semi-circular cutting edges 62 will be greater than the wire diameter. Each edge 62 has a countersink 129.

The corresponding opposed semi-circular tabs 133 of one backup plate nest within the corresponding semi-circular recesses 135 of the aligned other backup plate. The stripper blades 53 are piloted to the backup plates 51 over the corresponding locating pins 58 of said backup plates, FIG. 17. The assembly 139 of a backup plate 51 with respect to a blade 53 is welded as a unit at 64, FIG. 18.

These assemblies 139 are inserted within the corresponding opposed head recesses 49 and 55 of the stripper 37 and bonded thereto at 141, FIG. 18, by a suitable cement.

The final assembly is fragmentarily illustrated in FIG. 19 wherein the opposed heads 47 and 56 of stripper 37 are shown in registry with the corresponding blade and backup plate assemblies 139 in registry. The use of the corresponding tabs 133 and recesses 135 assure that the corresponding cutting apertures 62 of the opposed blades will be in alignment for the stripping operation.

OPERATION

In operation, after the initial manual retraction of the trigger arm 75 from the position shown in FIG. 1, cam 95 is adapted to operatively engage jaw arm 35 at the inner end of the pivotal jaw 29 for forcefully moving jaw 29 towards stationary jaw 27. With the stripper assembly 37 and the blades 53 in place, FIG. 20, such bringing together of the respective jaws causes the blades 53 at their corresponding cutting apertures 62, FIG. 18, to cut through the insulation I without engagement with the wire core W. At the same time the opposed backup plates 55 are in operative engaging registry with the insulation I. This prevents accidental longitudinal movement of the insulated wire during the severing of the insulation therefrom. Backup plates 51 have corresponding clearance recesses 137 radially outward of apertures 62, FIG. 18. These recesses have radii greater than the radius of wire W to compressively engage the insulation I, FIG. 19.

Having described my invention, reference should now be had to the following claims:

I claim:

1. A tool for stripping tubular insulation off of a central wire without contacting the wire comprising a hollow body in the general shape of a pistol having a nose at one end with an aperture arranged upon a longitudinal axis, adapted to axially receive an insulated wire to be stripped, a pistol grip and a trigger pivotally mounted within said body;

said body including a fixed jaw at said one end;

there being a corresponding cut away portion in said body adjacent said fixed jaw;

an upper jaw overlying said fixed jaw, extending into and pivotally mounted upon said body, and at one end terminating in a jaw arm;

an elongated wire stripper of resilient material having an apertured yoke at one end, a pair of opposed outwardly biased support arms extending from said yoke with said arms terminating in a pair of opposed spaced transversely slotted blade mounting heads;

co-planar blades secured within said heads respectively with opposed semi-circular openings at their meeting edges of a radius slightly greater than the radius of said wire;

said wire stripper being operably nested and retained between said jaws;

a cam upon said trigger arranged adjacent said jaw arm;

initial manual retraction of said trigger moving said cam operably engaging said jaw arm and pivotally closing the movable jaw relative to said fixed jaw, with said blades at said openings cutting through said insulation;

a cam lever at one end pivotally mounted within said body;

a pull rod at its opposite ends pivotally connected to said stripper yoke and to the other end of said cam lever respectively; and cooperating cam means between said trigger and cam lever;

successive additional retraction of said trigger retracting said stripper and axially separating the severed insulation from said wire.

2. In the insulation stripper of claim 1, further comprising said body, including a pair of opposed symmetrical molded body halves upon opposite sides of a plane passing through said axis;

a plurality of opposed apertured bosses in said body halves, adjacent its opposite ends, adjacent the top and bottom of said pistol grip and intermediate the ends of said body; and a plurality of transverse fasteners extending through said bosses for pivotally mounting said upper jaw, pivotally and adjustably mounting said trigger and for fixedly interconnecting said body halves respectively.

3. In the insulation stripper of claim 2, further comprising said body halves together defining said fixed jaw.

4. In the insulation stripper of claim 1, further comprising a wire stop transversely mounted upon one of said stripper arms and adjustably secured thereto along its length at a preset distance from one blade mounting head and arranged in the path of axial assembly of said body nose relative to a wire to be stripped, so that the length of the stripped portion corresponds to said preset distance.

5. In the insulation stripper of claim 4, further comprising there being elongated outwardly directed anchor groves upon opposite sides of said one stripper arm, said stop being of concave/convex shape with inturned angular ends slidably and frictionally positioned within said groves for longitudinal adjustment of said stop upon said arm.

6. A tool for stripping tubular insulation off of a central wire without contacting the wire comprising a hollow body in the general shape of a pistol having a nose at one end with an aperture arranged upon a longitudinal axis, adapted to axially receive an insulated wire to be stripped, a pistol grip and a trigger pivotally mounted within said body;

said body including a fixed jaw at said one end;

there being a corresponding cut away portion in said body adjacent said fixed jaw;

an upper jaw overlying said fixed jaw, extending into and pivotally mounted upon said body, and at one end terminating in a jaw arm;

an elongated wire stripper of resilient material having an apertured yoke at one end, a pair of opposed outwardly biased support arms extending from said yoke with said arms terminating in a pair of opposed spaced transversely slotted blade mounting heads;

co-planar blades secured within said heads respectively with opposed semi-circular openings at their meeting edges of a radius slightly greater than the radius of said wire;

said wire stripper being operably nested and retained between said jaws; and a cam upon said trigger arranged adjacent said jaw arm;

initial manual retraction of said trigger moving said cam operably engaging said jaw arm and pivotally closing the movable jaw relative to said fixed jaw, with said blades at said openings cutting through said insulation.

7. In the insulation stripper of claim 6, further comprising said body including a pair of opposed symmetrical molded body halves upon opposite sides of a plane passing through said axis;

a plurality of opposed apertured bosses in said body halves, adjacent its opposite ends, adjacent the top and bottom of said pistol grip and intermediate the ends of said body; and a plurality of transverse fasteners extending through said bosses for pivotally mounting said upper jaw, pivotally and adjustably mounting said trigger and for fixedly interconnecting said body halves respectively.

8. In the insulation stripper of claim 6, further comprising a wire stop transversely mounted upon one of the stripper arms and adjustably secured thereto along its length at a preset distance from one blade mounting head and arranged in the path of axial assembly of said body nose relative to a wire to be stripped, so that the length of the stripped portion corresponds to said preset distance.

9. In the insulation stripper of claim 6, further comprising there being elongated outwardly directed anchor grooves upon opposite sides of said one stripper arm, said stop being of concave/convex shape with inturned angular ends slidably and frictionally positioned within said groves for longitudinal adjustment of said stop upon said arm.

10. In the insulation stripper of claim 1, further comprising said cooperating cam means including a trigger arm on and extending from said trigger; and an arcuate cam arm on and connected to said cam lever, said trigger arm operably engaging said cam arm for rotating said cam lever and retracting said pull rod.

11. In the insulation stripper of claim 10, further comprising an elongated leaf spring anchored within said grip and having one arm bearing against and yieldably biasing said cam lever to a normal first position, yieldably resisting its movement to a second position, and after manual release of said trigger returning said cam lever pull rod and wire stripper to their first positions.

12. In the insulation stripper of claim 6, further comprising the end of said cam arm operably engaging said trigger adjacent its pivot mounting, said spring and cam lever normally biasing said trigger to a normally advanced position, said upper jaw being normally opened.

13. In the insulation stripper of claim 1, further comprising said jaw arm including a pair of spaced arm extensions at one end thereof; and there being a corresponding pair of laterally spaced cams upon said trigger respectively underlying and in engagement with said arm extensions.

14. In the insulation stripper of claim 1, further comprising, the pivot mounting of said trigger including a trigger pivot bolt having a second longitudinal axis transverse to and displaced from said first axis, and extending transversely through said body and secured thereto; and a central trigger mount on said bolt arranged upon an axis eccentric to said second axis, rotation of said pivot bolt relative to said body through a limited arc, modifying the center distance between the trigger cam and said jaw arm, for preselecting the rotative cutting arc of said upper jaw.

15. In the insulation stripper of claim 14, further comprising said pivot bolt including a pair of pivot hubs adjacent its opposite ends supported upon said body, one of said hubs being knurled for increased frictional engagement with said body; and said bolt including a nut when partly unthreaded providing lateral adjustment of said bolt disengaging said knurled portion from said body to facilitate rotation of said bolt, thereafter reassembled and secured to said body.

16. In the insulation stripper of claim 15, further comprising said hubs being of different diameters, said pivot mount being of an intermediate diameter, so that the pivot bolt is always assembled through the body from one side thereof through its largest aperture.

17. In the insulation stripper of claim 6, further comprising said wire stripper heads with assembled blades being a unit assembly and replaceable by other wire stripper assemblies for blade wear and for change of wire and insulation diameters.

18. In the insulation stripper of claim 17, further comprising a back-up plate mounting a cutter blade, the respective back-up plates being centered with respect to said longitudinal axis and cemented into the corresponding heads.

19. In the insulation stripper of claim 18, further comprising a pair of longitudinally spaced locating pins on one side of said back-up plates respectively and a corresponding pair of openings in each blade receiving said pins.

20. In the insulation stripper of claim 6, further comprising said fixed jaw and upper jaw at their outer ends terminating in a plurality of longitudinally spaced inwardly direct tangs with alternating slots, with the tangs of one jaw displaced to nest within the slots of the opposing jaw; and said tangs having opposed longitudinally extending slots arranged generally along said longitudinal axis to cooperatively and supportably receive and center the wire to be stripped.

21. In the insulation stripper of claim 20, further comprising opposed portions of said jaws longitudinally inwardly of said tangs being slotted to define opposed flexible portions in said jaws for resiliently engaging the wire to be stripped.

22. In the insulation stripper of claim 20, further comprising said tang slots being right angular to define an opening of square cross section.

* * * * *